March 1, 1949.  F. D. SNELL ET AL  2,463,327
WATER STERILIZER
Filed April 3, 1943
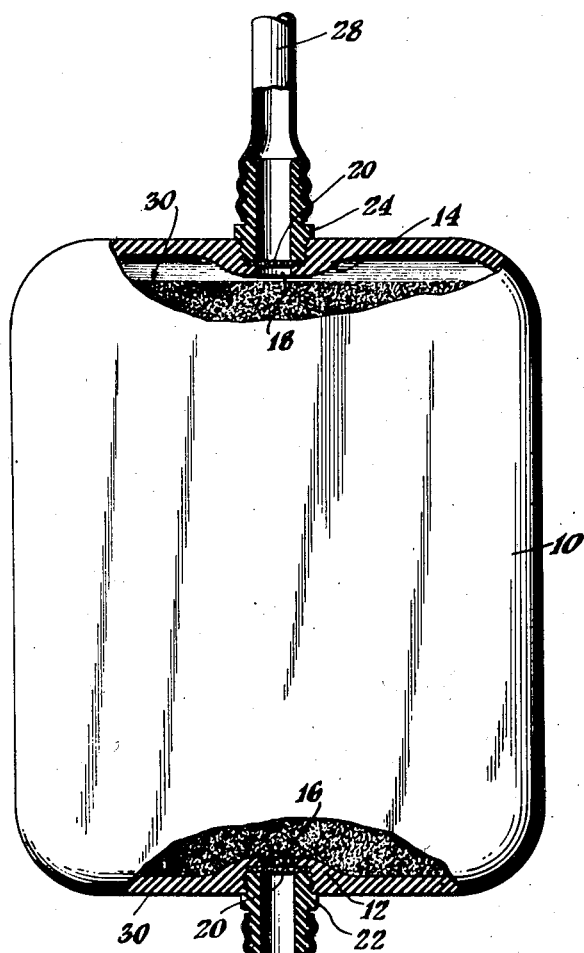
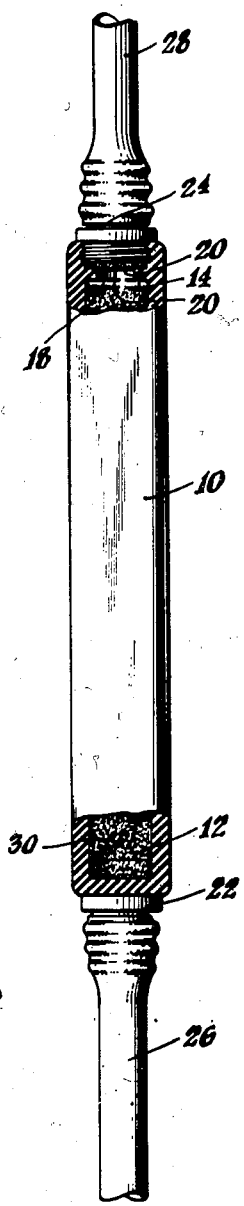
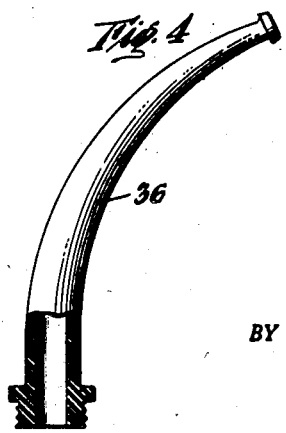
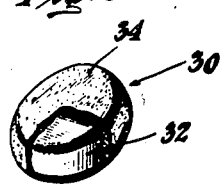
INVENTORS
Foster Dee Snell
Rebecca L. Shapiro
BY Robert Calvert
ATTORNEY Patented Mar. 1, 1949

2,463,327

UNITED STATES PATENT OFFICE 2,463,327

WATER STERILIZER

Foster Dee Snell and Rebecca L. Shapiro, New York, N. Y., assignors to Foster D. Snell, Inc., a corporation of New York Application April 3, 1943, Serial No. 481,686

1 Claim. (Cl. 210—203)

This invention relates to an assembly for disinfecting water and an improved disinfectant for use therein.

The invention provides a disinfectant that although consisting in its exposed parts of oligodynamic silver is light in weight, effective as a bactericide, and durable under conditions of use so that the silver which occurs as a coating over the core material is not removed by long continued passage of water through the disinfectant or even deformation of the silver coated particles constituting the disinfectant. The invention provides also a convenient assembly of the disinfectant such as may be kept in the breast pocket of the uniform of a soldier and used for destroying bacteria in infected water, as by sucking the water through a layer of the disinfectant in the pocket container and into the mouth.

Briefly stated, the invention comprises a disinfectant for water consisting of particles of appreciably water permeable plastic material coated with a continuous thin layer of silver which is footed in the surface portions of the plastic and a container for the disinfectant of the kind illustrated and claimed, especially a container which, when water is drawn through it and through the oligodynamic silver contained therein, does not set up galvanic action with the silver. The invention comprises such a container no part of which coming in contact with water during use has a solution tension in water that is substantially higher than the solution tension of silver, the container having means for preventing loss of the particles of silver from the outlet to or outlet from the container.

The invention is particularly useful in connection with the disinfecting of water by the individual soldier for his own drinking during field operations. The invention will, therefore, be illustrated by detailed description in connection with a portable assembly particularly adapted to such military use.

Such an assembly is shown in the attached drawing to which reference is made.

Fig. 1 is a side elevation of the preferred form of water disinfecting assembly.

Fig. 2 is an edge elevation of the same assembly.

Fig. 3 is an enlarged perspective view of the preferred type of disinfectant for use in the assembly of Figs. 1 and 2, the exact shape of the particle shown being relatively unimportant although generally round particles are preferred.

Fig. 4 is a side view of an alternative form of mouth piece for use in connection with the assemblies of Figs. 1 and 2.

Views shown in all of the figures are partly broken away for clearness of illustration.

There is shown a container 10 provided with oppositely disposed inlet and outlet tubular portions 12 and 14 provided with openings 16 and 18. Through these the disinfectant may be charged and, when the assembly is in use, water drawn into the container and then from the container.

Disposed over the openings 16 and 18 are means such as apertured sheet members 20 for retaining the disinfectant while permitting the flow of water through the said members.

In a preferred embodiment of the invention the portions of the container adjacent to the said inlet and outlet are suitably thickened and provided with screw threads for receiving the exteriorly threaded nipples 22 and 24. These nipples at their inner ends clamp the edges of the retaining members against the adjacent portions of the container, as shown.

The inlet may be provided with a tubular connection such as a rubber hose 26 to be dropped into the supply of infected water. The nipple 24, on the other hand, may be provided with tubular member 28 which may be introduced into the mouth of the drinker so that water is sucked directly through the disinfecting assembly to the mouth.

The container is supplied with a granular, filtering, disinfecting material 30, preferably to the level at which the container is nearly filled with the disinfecting material.

There is shown in Fig. 3 a suitable kind of disinfecting material. The particle there shown in enlarged condition contains a firm but yieldable and appreciably water permeable plastic core 32 and a thin coating of silver 34. The silver coating is disposed continuously around and in contact with the said core and preferably is footed in the core by the penetration of silver solution into the core before or during the time of deposition of the silver from the solution used in producing the coating of silver over the particle.

In Fig. 4 there is shown an alternative form of mouth piece 36 that may be substituted for the nipple 24 and tube 28 of Fig. 1.

The container 10 and all parts thereof that are in contact with water during use of the disinfecting assembly, that is, all inner parts of the container and connections are constructed of material that in contact with an aqueous salt solution does not set up galvanic action with metallic silver. Suitably the container is constructed of material of practically no solution tension or solution tension the same as that of silver itself. Thus, the container may be made of any suitable plastic, for example, a phenol aldehyde resin, styrene, or melamine aldehyde resin. In an alternative form the container is constructed of silver or of other metal completely silver plated over the inside.

The retaining members 20, like the container have likewise such a solution tension, so as to cause no galvanic action with silver. The retaining members are suitably apertured sheet materials such as linen, canvas, perforated silver sheet, or silver gauze, silver gauze being particularly satisfactory. In any case the size of the openings through the retaining material 20 should be less than the size of the particles 30 to be retained so as to prevent the passage of particles of disinfecting material.

The retaining members 20 are held in position by any suitable means, as, for example by frictional engagements between the inner parts of the nipples 22 or 24 and a thickened part of the inlet or outlet portions 12 and 14 respectively of the container.

As the disinfecting material there is used to advantage a silver coated plastic that is firm but yieldable under high pressure and that is appreciably water permeable. Thus, the disinfecting material may be made by the use of an appreciably water penetrable plastic in the form of pellets, beads, or granules such as charged to conventional injection molding machines, soaking these plastic particles in a solution of stannous chloride, washing, and then coating the soaked and washed particles with silver, by immersing the particles in an ammoniacal silver nitrate solution containing a substantial proportion of sodium hydroxide and sufficient ammonium hydroxide to prevent the formation of a precipitate of the silver with the hydroxyl ion of large concentration furnished by the sodium hydroxide, or as described more fully in copending application of Foster Dee Snell and George C. Lord, Serial No. 480,482, filed March 25, 1943, and now abandoned for Metal coated plastic and method of making. Reduction of the silver in the ammoniacal silver nitrate solution is effected by a reducing agent such as the reducing sugar as described in the said application, dextrose being the preferred material. There is thus formed a product in which the water permeable plastic carries a plural coating consisting of an undercoat of a tin-containing material and an outer coating of silver. The silver not only extends an appreciable distance into the plastic but also is in contact with the undercoat. Examples of the plastic that may be used in powdered or granular form and then silver coated are polymerized vinyl acetate, urea formaldehyde or alkyd resins. As stated in the said application the plastic must be insoluble in water.

Fig. 3 shows a typical particle of plastic material and the adhered silver coating, the thickness of the latter being somewhat exaggerated for the purpose of illustration. Actually the proportion of silver preferred to the total weight of silver and plastic particle is about 0.2 to 1 part and preferably about .2 to .4 part of silver for 100 parts of the plastic.

When such a disinfectant is used in our assembly there is destruction of the bacteria of even badly infected water passed through the disinfectant and satisfactory adherence of the silver to the plastic particles in which the silver is footed by the process of manufacture described, even though the coated plastic particles are subjected to severe conditions of use.

Using this type of disinfectant and passing an infected water through the container at the rate of 1 volume of water to approximately 1.5 volumes overall of disinfectant, per minute, practically complete disinfecting is obtained in all cases.

Thus, there was used water which was heavily contaminated with a culture of *E. coli*. One hundred and fifty cc. water per minute was drawn through a 4.5 inch layer of the disinfectant containing 120 cc. of the particles and void spaces therebetween totalling about 60 cc. This water was drawn through the disinfectant in the container, therefore, at such a rate that, assuming uniformity of flow of the water through the bed of disinfectant, there was a change of water in the disinfectant about 2.5 times each minute. Allowing for uneven flow, it is considered that the water was retained for about 10 seconds or more in the region of maximum rate of flow.

Samples of the effluent water were collected under aseptic conditions and plates then made of samples, with 1 cc. of each sample on standard nutrient agar. The plates were incubated at 37° C. for 24 hours and the colonies of bacteria counted. Several samples collected in succession showed negative in the number of colonies per cc. after incubation, even when the infected water used showed on like incubation 2000 colonies per cc.

For best results in repeated use of a given specimen of disinfectant, a period of contact of the water of about 15 seconds or somewhat more is preferred. For this reason the inlet or outlet of the container should be restricted, as shown in the drawings, that is, be of relatively small area of cross section so that a person sucking on the outlet 28 will draw water through a container of breast pocket size at such a rate that the period of contact of the water is about 15 seconds to one minute. In this connection, it should be noted that the retaining members 20, particularly when finely woven material, serve also as restrictions, to establish a maximum rate of flow of water through the system at a given reduced pressure.

When the disinfecting material is made as described and is of mesh within the range of approximately 15 to 50 and preferably 20 to 30, the bed of material through which the infected water passes may be shallow, as, for example about 3 to 10 inches, with the obtaining of complete disinfecting on passing through the disinfectant of water containing the usual type of bacteria which are met in waters.

It will be understood that it is intended to cover all changes and modifications of the example of the invention herein chosen for the purpose of illustration which do not constitute departures from the spirit and scope of the invention.

What is claimed is:

A portable water disinfecting unit comprising a container constructed entirely of water insoluble plastic material and provided with spaced apertures serving as inlet and outlet, respectively, for the water to be disinfected, bactericidal silver coated plastic granules disposed within the container and between the said inlet and outlet, a tube of plastic material fitting within each of the said apertures, a shoulder extending inwardly on the wall of each of the apertures defining a space between the said shoulder and the end of the tube fitting within the aperture, and a silver screen extending across the end of each of the tubes and held in the said space by engagement between the said shoulder and the end of the tube, the size of openings in the silver screen being smaller than the size of the silver coated granules so that the granules are retained on the screen when water is passed through the assembly and the dimensions of the screens being not substantially greater than the outside dimensions of the ends of the tubes fitted into the apertures.

FOSTER DEE SNELL.
REBECCA L. SHAPIRO.

REFERENCES CITED

The following references are of record in the file of this patent:

UNITED STATES PATENTS

| Number | Name | Date |
|---|---|---|
| 109,288 | Bean | Nov. 15, 1870 |
| 346,304 | McLean et al. | July 27, 1886 |
| 485,551 | Luscombe et al. | Nov. 1, 1892 |
| 494,837 | Bellamy | Apr. 4, 1893 |
| 582,496 | Avery | May 11, 1897 |
| 1,473,331 | Bechhold | Nov. 6, 1923 |
| 1,557,234 | Bechhold | Oct. 13, 1925 |
| 1,557,235 | Bechhold | Oct. 13, 1925 |
| 1,642,089 | Schreier | Sept. 13, 1927 |
| 1,978,447 | Austerweil et al. | Oct. 30, 1934 |
| 1,988,246 | Krause | Jan. 15, 1935 |
| 2,008,131 | Dieck | July 16, 1935 |
| 2,066,271 | Irwin | Dec. 29, 1936 |
| 2,105,552 | Ruben | Jan. 18, 1938 |
| 2,167,225 | Van Eweyk | July 25, 1939 |
| 2,198,378 | Ellis | Apr. 23, 1940 |
| 2,251,234 | Swain | July 29, 1941 |
| 2,257,944 | Fischbein | Oct. 7, 1941 |
| 2,278,722 | Loiseleur | Apr. 7, 1942 |
| 2,283,883 | Conconi | May 19, 1942 |
| 2,344,548 | Goetz | Mar. 21, 1944 |
| 2,355,933 | Weiss | Aug. 15, 1944 |
| 2,366,007 | D'Alelio | Dec. 26, 1944 |

FOREIGN PATENTS

| Number | Country | Date |
|---|---|---|
| 2,859 | Great Britain | Feb. 7, 1896 |
| 19,940 | Great Britain | Dec. 11, 1889 |
| 331,122 | France | July 18, 1903 |
| 402,953 | Great Britain | Dec. 14, 1933 |
| 427,199 | Great Britain | Apr. 17, 1935 |
| 524,819 | Great Britain | Aug. 15, 1940 |